Aug. 26, 1947.  R. R. BORNGRAEBER  2,426,482
SOIL PULVERIZER WITH CLEANER
Original Filed May 28, 1943  2 Sheets-Sheet 2
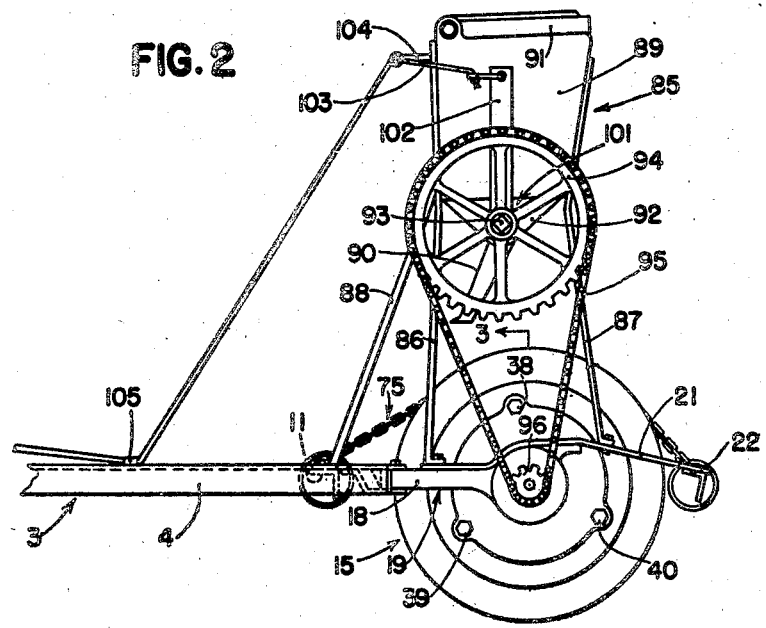
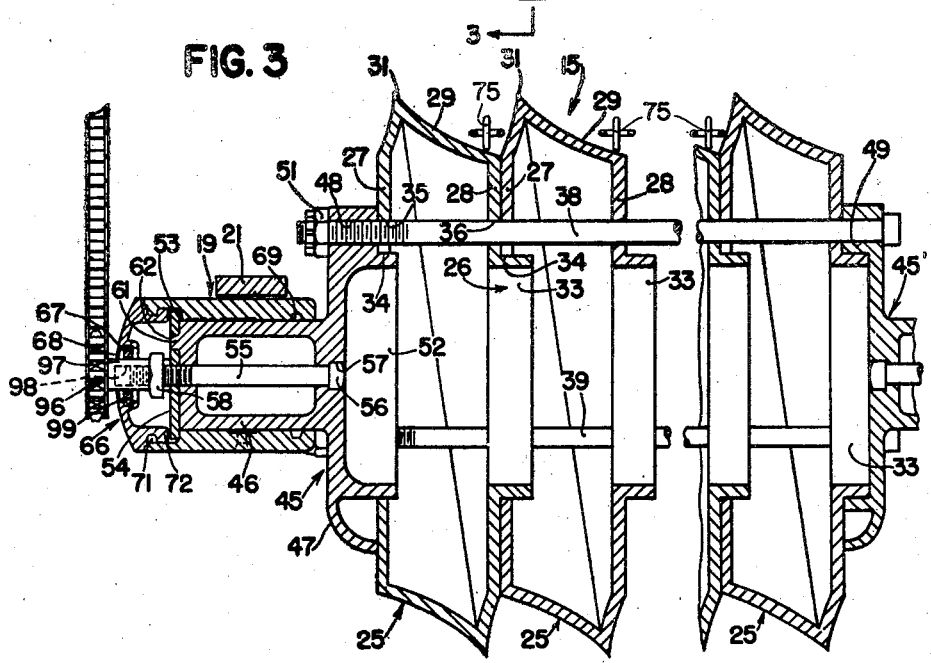
INVENTOR
ROYCE R. BORNGRAEBER
ATTORNEY Patented Aug. 26, 1947

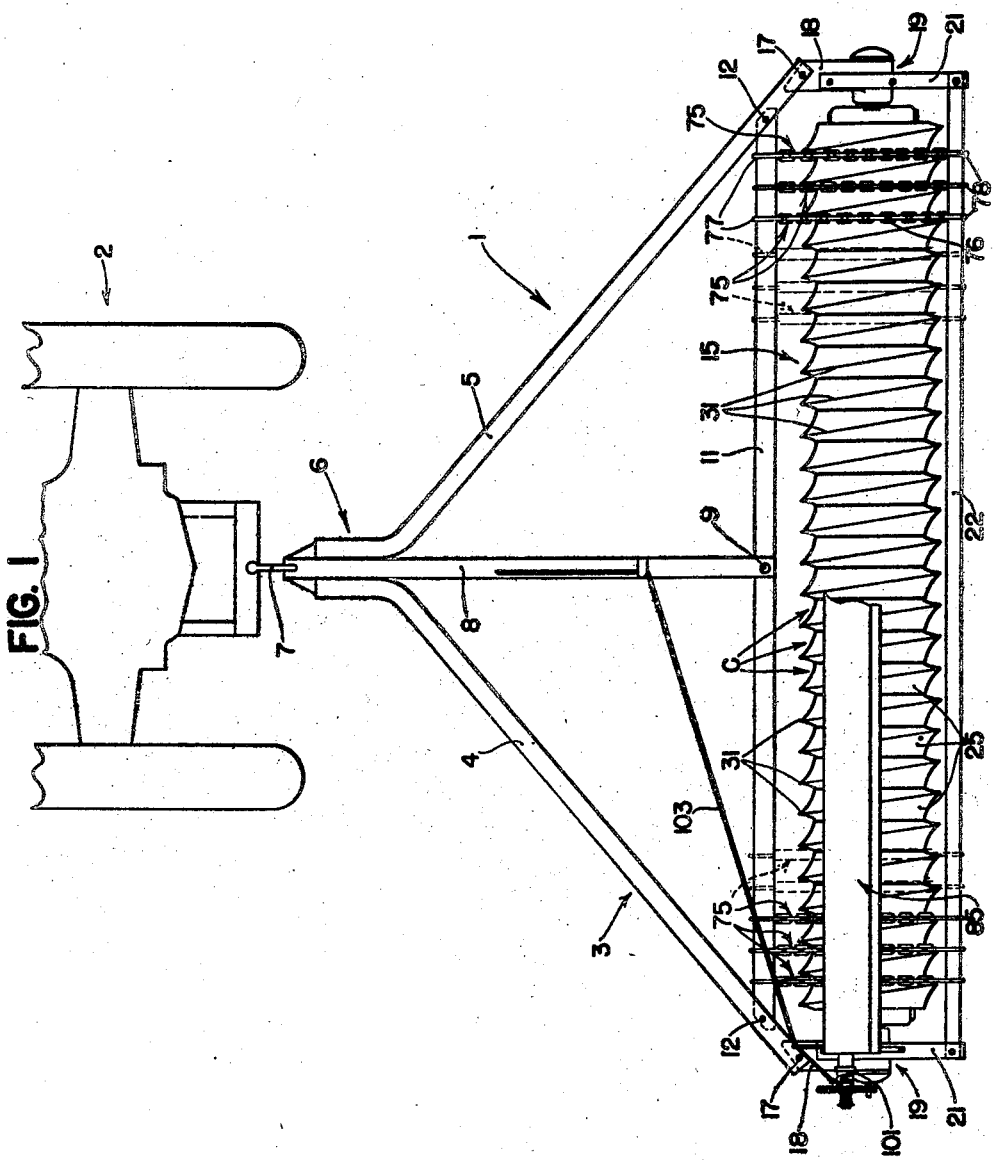

2,426,482

UNITED STATES PATENT OFFICE 2,426,482

SOIL PULVERIZER WITH CLEANER

Royce R. Borngraeber, Horicon, Wis., assignor to The Van Brunt Manufacturing Co., Horicon, Wis., a corporation of Wisconsin Original application May 28, 1943, Serial No. 488,930, now Patent No. 2,418,937, dated April 15, 1947. Divided and this application August 30, 1944, Serial No. 551,925

3 Claims. (Cl. 97—224)

This application is a division of the co-pending application, Serial No. 488,930, filed May 28, 1943, for Soil pulverizer, by William A. Hyland and myself.

The present inventon relates generally to land rollers, such as packers, pulverizers and the like, and is more particularly concerned with packers having a V-shaped roller surface.

The object and general nature of the present invention is the provision of a simple and inexpensive type of packer in which the axle is eliminated, and more particularly it is a feature of this invention to provide a packer in which the cutting edges of the wheels are undulatory, rather than lying in planes that are perpendicular to the axis of rotation of the roller element, and in which new and improved scraper means particularly adapted to clear the soil from the corrugations of the roller element, notwithstanding the zig-zag formation thereof, is provided. Specifically, a feature of this invention lies in the provision of loosely mounted chains, one in each of the grooves of the assembled packer wheels forming the roller element, as the scraper or soil clearing means, with sufficient slack to provide for the lateral shifting necessary to permit each of the chains to stay in its own groove during the rotation of the roller element.

These and other advantages of the present invention will be apparent to those skilled in the art after a consideration of the following detailed description, taken in conjunction with the accompanying drawings.

In the drawngs:

Figure 1 is a plan view of a packer or pulverizer in which the principles of the present invention have been incorporated.

Figure 2 is a side view of the machine shown in Figure 1, with the seeding attachment in place.

Figure 3 is an enlarged view taken generally along the line 3—3 of Figure 2.

Referring now to the drawings, and more particularly Figures 1, 2 and 3, the land roller is indicated in its entirety by the reference numeral 1 and is propelled by a farm tractor indicated in its entirety by the reference numeral 2. The land roller 1 comprises a frame 3 which is made up of a pair of forwardly converging bars 4 and 5 which at their forward ends are connected together to form a hitch 6 that is connected by a clevis 7 to the tractor 2. The forward ends 6 of the bars 4 and 5 are also connected to the front end of a longitudinally extending frame member 8 which at its rear end is connected at 9 to a front cross bar 11. The bar 11 is bolted at its ends, as at 12, to the rear portions of the frame bars 4 and 5. The cross bar 11 is disposed in front of a land roller unit, indicated in its entirety by the reference numeral 15 and which will be described in detail below. The rear ends of the bars 4 and 5 are bolted, as at 17, to forward extensions 18 of journal box members 19, one of which is shown in detail in Figure 3. Short longitudinal bars 21 are bolted, at their forward ends to the journal box castings 19 and at their rear ends are bolted to a rear frame member 22, which is disposed rearwardly of the land roller unit 15.

As best shown in Figures 2 and 3, the roller unit 15 comprises a plurality of nested packer wheels 25, each wheel being open at its center, as indicated by the reference numeral 26, and provided with two side sections 27 and 28 connected together circumferentially by a V-shaped rim 29 in which a sharp cutting edge 31 is formed. The cutting edge 31 is disposed in a plane that extends at an acute angle with respect to the axis of the assembled wheels and, as best shown in Figure 3, lies fairly close to the plane of the side 27 of the wheel at one side thereof and at the other side thereof quite close to the plane of the other side 28. One of the sides of each wheel, as for example the side 28, is extended radially inwardly a slight additional amount as compared with the other side 27 and is provided with an axially directed flange 33, the outer diameter of which is substantially equal to the inner diameter of the opening 34 formed in the other side 27. Also, radially outwardly of the flange 33 and the opening 34 the sides 27 and 28 are provided with bolt-receiving openings 35 and 36, there being at least three of such openings in each side 27 and 28. The openings are in registry to permit passing a bolt therethrough. The flange 33 is adapted to receive the apertured portion 27 of the next adjacent wheel, and the other wheels, being identical, likewise receive the adjacent wheels in assembled or nested relation, with the openings 35 and 36 of all of the wheels in alignment. A plurality, preferably three, gang bolts or tie rods 38, 39 and 40 are extended through said wheels so as to hold them one against the other.

The roller unit 15 is mounted for rotation in the frame 1 between the front and rear cross bars 11 and 22 by a pair of bearing units which are shown in more detail and claimed in the co-pending divisional application, Serial No. 551,926, filed August 30, 1944, by William A. Hyland, to which reference may be made if necessary. At each side of the implement the journal member 19 receives a bearing member 45.

Each bearing member 45 is provided with a bearing proper, indicated by the reference numeral 46, and a flange section 47. The latter is apertured, as at 48 (Figure 3), to receive the ends of the gang bolts 38, 39 and 40, the bearing member 46 being a cylindrical section disposed for rotation in the journal box 19. Figure 3 shows the details of the bearing for the left end of the roller unit. The bearing construction for the right end is substantially the same except that, as best shown in Figure 3, the right hand end bearing 45' is provided with a recess 49 to receive the flange 33 of the right hand wheel unit 25. It will be seen from Figure 3 that the heads of the gang bolts 38, 39 and 40 bear against the flange section of the right hand bearing member 45' while the threaded ends of the gang bolts pass through the flange section 47 of the bearing member 45, and screwed onto the threaded ends of the gang bolts are nuts 51 which, when tightened, serve to clamp both bearing members 45 and 45' and all of the packer wheels firmly and rigidly together in assembled relation. It will be noted that the flange section 47 includes an axially directed section 52 which is of substantially the same dimensions as the flange 33 of the packer wheel, and hence fits snugly within the opening 34 in the side 27 of the laterally outer packer wheel. The wheel section 34 and the flange 52 at each end of the roller unit form cooperating shouldered and abutment portions which maintain the end bearings, described below, in alignment.

It will be noted that this form of roller unit requires no through axle shaft. The associated journal box 19 is formed with an outwardly facing shoulder 53 against which a thrust plate 54 bears. The thrust plate 54 is rigidly clamped to the bearing member 46 by means of a bolt 55, the square head 56 of which seats in a correspondingly formed socket 57. The threaded end of the bolt 55 extends laterally outwardly through the adjacent portion of the bearing member 46 and the thrust plate 54 and receives a nut 58 which when tightened fixes the plate 54 to the associated bearing member. In order to keep the thrust plate from turning relative to the bearing member, the latter is formed with a lug 61 that is adapted to be disposed in an opening 62 formed in the thrust plate. The outer end of the journal box is closed by a cap 66 having an interior annular inwardly facing groove 67 and a weakened frangible section 68. At the inner side the journal box 19 is provided with inner sealing means 69. The cap member 66 is secured to the journal box 19 by any suitable means as a bayonet type joint 71 or any other suitable fastening means, so that the inner shoulder 72 of the cap 66 is disposed against the outer face of the thrust plate 54, thus confining the latter and preventing axial displacement of the roller unit relative to the frame and vice versa. It will be understood that the bearing construction at the other side of the implement is as described above.

Referring to Figure 1, it will be noted that with the cutting edges 31 disposed in inclined or angled planes, the corrugations or radially inwardly disposed portions C are likewise disposed in planes lying at an angle to the axis of the roller unit 15, and hence fixed scrapers fastened to the frame 1 cannot be provided for clearing the corrugations C of adhering soil and the like. According to the principles of the present invention, I provide a plurality of laterally flexible means connected with the frame 1 and lying in the grooves or corrugations C of the roller unit 15 so as to clear the same of adhering soil and the like but, being flexible, easily accommodating the lateral shifting of the corrugations or grooves when the roller unit 15 rotates. These scraper elements, indicated in their entirety by the reference numeral 75, comprise chains 76 anchored at their front ends by means of rings 77 to the front cross bar 11 and by means of rings 78 at their rear ends to the rear cross bar 22. The chains 75 are fitted with sufficient looseness so that they may have the requisite lateral movement to follow the corrugations C during the rotation of the roller unit 15.

As best shown in Figure 2, a seeding attachment 85 may be mounted on the frame 3, as by pairs of braces 86 and 87 and a center brace 88 cooperating with the center frame bar 8. The seeding unit 85 is more or less of conventional construction, comprising a seed container 89 having a hinged cover 91 and suitable seed dispensing elements 92 controlled or driven by a seeding shaft 93. The seed dispensing elements 92 carry or are provided with suitable spout means 90 constructed so as to scatter the seed forward of the packer wheels 25. A relatively large sprocket wheel 94 is fixed to the left end of the seeding shaft 93 and receives a sprocket chain 95 trained around a driving sprocket pinion 96. The sprocket pinion 96 is of special construction and, as best shown in Figure 3, includes a hub portion 97 provided with an interior threaded socket 98 whereby the sprocket pinion 96 may be screwed onto the end of the bolt 55 after the central part of the frangible or knock-out section 68 of the cap 66 has been broken away. To prevent loss of lubricant at this point, whenever the sprocket pinion 96 is mounted, suitable sealing means 99 is placed in the groove 67. The seeding unit 85 includes a control clutch 101 connected between the sprocket 94 and the seeding shaft 93. The clutch 101 is controlled by an arm 102 to the upper end of which a cable 103 is connected. The cable 103 extends forwardly through a supporting bracket 104 and is slidably received in a clip 105 carried by the center frame member 8, from which the cable 103 extends forwardly to the operator's station on the tractor. If desired, the cable 103 may be extended from the bracket 104 directly forwardly to the tractor. The present invention is not especially concerned with the particular details of the throw-out clutch 101.

In operation, as the tractor 2 draws the pulverizer 1 across the field, the wheels 25 all rotate together, and due to the angularity of the edges 31, the grooves or corrugations C move with what might be termed a wobble or oscillatory action. The soil is prevented from packing within the grooves C by the chains 75. These chains, some of which are indicated in dotted lines in Figure 1, are mounted with sufficient looseness to move laterally back and forth as the roller element 15 rotates. The chains 75, being flexible elements, are admirably adapted to accommodate the aforesaid oscillatory or wobble action of the cutting edges 31 and the grooves or corrugations therebetween. Additionally, the rings 77 and 78 may shift laterally along the bars 11 and 21.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a land roller, frame means, a roller element comprising a plurality of soil engaging wheels fastened together in axial relation, said wheels having cutting edges with portions at the side of the planes of said cutting edges disposed radially inwardly, the planes of said cutting edges being disposed at an angle to the axis of said interconnected wheels, bearing means connecting the assembly of interconnected wheels with said frame means, and a plurality of laterally flexible scraper elements connected with said frame means and engaging said wheels in the spaces between said cutting edges, the lateral flexibility of said scraper elements accommodating the inclination of the planes of the cutting edges when the roller element rotates.

2. In a soil packer, pulverizer or the like, a plurality of soil-engaging wheels, each consisting of a member having laterally spaced sides the outer portions of which are connected by a rim portion of V-section, forming a cutting edge that is disposed in a plane making an acute angle with respect to the axis of said wheel member, and cleaner elements lying in the spaces between said cutting edges and including laterally flexible sections which accommodate the lateral back and forth shifting of the cutting edges during the rotation of said wheel members.

3. In a soil packer, pulverizer or the like, a frame, a roller element journaled for rotation in said frame and including a series of radially outwardly disposed cutting edges with concave-like sections therebetween, each cutting edge being circumferentially complete and different portions of each cutting edge being disposed in different axial positions with respect to each other, whereby during the rotation of the roller element the space between cutting edges along the upper side of the roller element shifts axially laterally back and forth, and a plurality of cleaner elements, one being disposed between each adjacent pair of cutting edges, each of said cleaner elements being connected with said frame and including laterally flexible portions to accommodate the aforesaid back and forth movement.

ROYCE R. BORNGRAEBER.

REFERENCES CITED

The following references are of record in the file of this patent:

UNITED STATES PATENTS

| Number | Name | Date |
|---|---|---|
| Re. 18,039 | Brack | Apr. 14, 1931 |
| 723,896 | Moore | Mar. 31, 1903 |
| 1,045,024 | Helmich | Nov. 19, 1912 |
| 297,084 | Munz | Apr. 15, 1884 |
| 1,782,201 | Dunham | Nov. 18, 1930 |
| 2,300,851 | Wolfard | Nov. 3, 1942 |

FOREIGN PATENTS

| Number | Country | Date |
|---|---|---|
| 446,396 | France | Oct. 2, 1912 |